United States Patent
Fenton et al.

(10) Patent No.: US 6,465,136 B1
(45) Date of Patent: Oct. 15, 2002

(54) MEMBRANES, MEMBRANE ELECTRODE ASSEMBLIES AND FUEL CELLS EMPLOYING SAME, AND PROCESS FOR PREPARING

(75) Inventors: James M. Fenton, Tolland; H. Russell Kunz, Vernon; Michael B. Cutlip, Willimantic; Jung-Chou Lin, Storrs, all of CT (US)

(73) Assignee: The University of Connecticut, Storrs, CT (US)

(*) Notice: Subject to any disclaimer, the term of this patent is extended or adjusted under 35 U.S.C. 154(b) by 0 days.

(21) Appl. No.: 09/562,235

(22) Filed: Apr. 28, 2000

Related U.S. Application Data
(60) Provisional application No. 60/132,038, filed on Apr. 30, 1999.

(51) Int. Cl.$^7$ .................................................. H01M 8/10
(52) U.S. Cl. ........................... 429/309; 429/30; 429/33; 429/40; 429/46; 429/304; 429/306
(58) Field of Search .............................. 429/30, 33, 40, 429/46, 304, 306, 309

(56) References Cited

U.S. PATENT DOCUMENTS

| | | |
|---|---|---|
| 4,073,752 A | 2/1978 | Ramp |
| 5,082,472 A | 1/1992 | Mallouk et al. |
| 5,094,895 A | 3/1992 | Branca et al. |
| 5,183,545 A | 2/1993 | Branca et al. |
| 5,211,984 A | 5/1993 | Wilson |
| 5,234,777 A | 8/1993 | Wilson |
| 5,330,860 A | 7/1994 | Grot et al. |
| 5,547,551 A | 8/1996 | Bahar et al. |
| 5,919,583 A * | 7/1999 | Grot et al. ..................... 429/33 |
| 6,059,943 A * | 5/2000 | Murphy et al. ............. 204/296 |

FOREIGN PATENT DOCUMENTS

| WO | WO 96/2975 | 9/1996 |
|---|---|---|
| WO | WO 96/29752 | 9/1996 |

\* cited by examiner

*Primary Examiner*—Carol Chaney
*Assistant Examiner*—Dah Wei D. Yuan
(74) *Attorney, Agent, or Firm*—Cummings & Lockwood

(57) ABSTRACT

A composite membrane structure is disclosed comprising a composite membrane and at least one protective layer disposed adjacent to the composite membrane. The composite membrane comprises a porous polymeric matrix and an ionically conductive solid, noble metal or combination thereof dispersed within the matrix, and preferably, a binder. The binder is preferably an ion exchange polymer. The protective layer comprises binder and ionically conductive solid, hygroscopic fine powder or a combination thereof.

Also disclosed is a composite membrane comprising an ionically conductive solid, a binder and support polymer. The membrane is formed by casting a solution of the support polymer, ionically conductive solid and binder to form a film. The film may optionally be combined with a protective layer as described above.

The cast composite membrane or the composite membrane structures, may be employed in a membrane electrode assembly (MEA) comprising a composite membrane structure or cast composite membrane, an anode, a cathode, and optional current collectors.

32 Claims, 7 Drawing Sheets

MEMBRANES, MEMBRANE ELECTRODE ASSEMBLIES AND FUEL CELLS EMPLOYING SAME, AND PROCESS FOR PREPARING

CROSS REFERENCE TO RELATED APPLICATIONS

This application is based on and claims the benefit of U.S. Provisional Patent Application No. 60/132,038, filed Apr. 30, 1999, the disclosures of which are incorporated by reference herein in their entirety.

BACKGROUND OF THE INVENTION

1. Field of the Invention

The present invention relates to fuel cells and components therefore. In particular this invention relates to membranes, membrane electrode assemblies and fuel cells employing the membranes and membrane electrode assemblies.

2. Description of the Related Art

A variety of electrochemical cells fall within a category of cells referred to as ion exchange membrane (IEM) cells. An IEM cell employs a membrane comprising an ion-exchange polymer. This ion-exchange polymer membrane serves as a physical separator between the anode and cathode while also serving as an electrolyte. IEM cells can be operated as electrolytic cells for the production of electrochemical products, or as fuel cells for the production of electrical energy. The best-known fuel cells are those using a gaseous fuel such as hydrogen, with a gaseous oxidant (usually pure oxygen or atmospheric oxygen), and those fuel cells using direct feed organic fuels such as methanol.

Fuel cells are attractive electrical power sources, due to their higher energy efficiency and environmental compatibility compared to the internal combustion engine. In contrast to batteries, which must be recharged, electrical energy from fuel cells can be produced for as long as the fuels, e.g., methanol or hydrogen, are supplied. Thus, a considerable interest exists in the design of improved fuel cells to fill future energy needs.

In many fuel cells, a cation exchange membrane is used wherein protons are transported across the membrane as the cell is operated. Such cells are often referred to as proton exchange membrane (PEM) cells. For example, in a cell employing the hydrogen/oxygen couple, hydrogen molecules (fuel) at the anode are oxidized by donating electrons to the anode, while at the cathode the oxygen (oxidant) is reduced by accepting electrons from the cathode. The $H^+$ ions (protons) formed at the anode migrate through the membrane to the cathode and combine with the reduced oxygen to form water. In many fuel cells, the anode and/or cathode comprises a layer of electrically conductive, catalytically active particles, usually in a polymeric binder such as polytetrafluoroethylene (PTFE), on the proton exchange membrane. Alternatively, the anode and the cathode layers are applied to the gas diffusion structure. The gas diffusion structure allows entry of the fuel or oxidant to the cell. The gas diffusion/electrode structure is hot pressed to the membrane. The resulting structure consisting of the membrane, electrodes and optional gas diffusion structure is referred to as a membrane electrode assembly (MEA). The manner of fabricating a high performing MEA depends strongly on the properties of the membrane. Factors such as the membrane chemical solubility, thermal stability, and mechanical strength are important.

One drawback of presently known fuel cells is the so-called crossover of fuel through the membrane. The term crossover refers to the undesirable transport of fuel through the membrane from the fuel electrode, or anode, side to the oxygen electrode, or cathode side of the fuel cell. After having been transported across the membrane, the fuel will either evaporate into the circulating oxygen stream or react with the oxygen at the oxygen electrode. Fuel crossover diminishes cell performance for two primary reasons. Firstly, the transported fuel cannot react electrochemically to produce useful energy, and therefore contributes directly to a loss of fuel efficiency (effectively a fuel leak). Secondly, the transported fuel interacts with the cathode, i.e., the oxygen electrode, and lowers its operating potential and hence the overall cell voltage. The reduction of cell voltage lowers specific cell power output and reduces the overall efficiency.

One particularly useful group of cation-exchange materials for membranes in PEM cells is perfluorinated sulfonic acid polymers such as NAFION®, available from E.I. duPont de Nemours & Co. Such cation-exchange polymers, when cast into films for membranes, have good conductivity and chemical and thermal stability, which provide long service life before replacement.

Perfluorinated sulfonic acid polymers such as NAFION® and other ion exchange materials have also been incorporated into films, for example porous polytetrafluoroethylene (PTFE), to form composite membranes, as described for example in U.S. Pat. No. 5,082,472, to Mallouk, et al.; JP Laid-Open Nos. 62-240627, 62280230, and 62-280231; U.S. Pat. No. 5,094,895 to Branca; U.S. Pat. No. 5,183,545 to Branca et al.; and U.S. Pat. No. 5,547,551 to Bahar, et al. Each of the foregoing references is incorporated herein in their entirety.

Another approach to construction of an ion exchange membrane is described in PCT/US96/03804 to Grot, et al. Grot et al. disclose a composite membrane with a thickness of less than 250 $\mu$m prepared by precipitation of a water-insoluble, inorganic conductor such as zirconium hydrogen phosphate into a porous NAFION® membrane. However, the composite membrane exhibits a very high amount of crossover, especially when operated at high temperatures. Similarly, S. Malhotra, et al., in Journal of the Electrochemical Society, Vol. 144, No. 2, L23–L26, 1997 disclose a NAFION® membrane containing phosphotungstic acid. Although the resulting composite membrane was said to demonstrate high conductivity at elevated temperature, the membrane lacked sufficient strength at reduced thickness for hydrogen fuel cell applications.

One significant drawback to the use of NAFION® and related polymers in membranes, composite membranes, and catalyst layers is that such materials are not efficient at high temperatures, especially the high temperatures seen in systems incorporating steam reforming or partial oxidation of fuel. The difficulty of on-board storage and refueling of hydrogen is a major concern in the application of hydrogen fuel cells in vehicles. One approach for surmounting this obstacle has been to utilize the hydrogen fuel obtained through steam reforming or partial oxidation of gasoline. Since hydrogen fuel from this source usually contains a trace amount of carbon monoxide, which causes severe poisoning of anode catalysts, such fuel cells are operated at high temperature to prevent carbon monoxide adsorption onto the anode catalysts. At these elevated temperatures, membranes comprising perfluorinated sulfonic acid polymers such a NAFION® quickly lose ionic conductivity due to dehydration.

There accordingly remains a need for an MEA with a membrane that maintains functionality in hydrogen fuel cells wherein hydrogen fuel contains trace carbon monoxide from the fuel processing. There further remains a need for a membrane exhibiting sufficient strength at reduced thickness, maintaining high conductance at elevated temperature, and minimum fuel crossover for hydrogen fuel cell applications.

SUMMARY OF THE INVENTION

The above described drawbacks and disadvantages are overcome or alleviated by a composite membrane structure comprising a composite membrane and at least one protective layer disposed adjacent to the composite membrane. The composite membrane comprises a porous polymeric matrix and an ionically conductive solid, noble metal or combination thereof dispersed within the matrix, and preferably, a binder. The binder is preferably an ion exchange polymer. The protective layer comprises binder and ionically conductive solid, hygroscopic fine powder or a combination thereof.

In one embodiment the composite membrane comprises a porous polymeric matrix and an ionically conductive solid. The ionically conductive solid is dispersed within the matrix. The composite membrane preferably also comprises a binder.

In another embodiment the composite membrane comprises a porous polymeric membrane, a binder, and a noble metal. The noble metal is dispersed within the matrix.

In another embodiment the composite membrane comprises a porous polymeric membrane, a binder, ionically conductive solid, and a noble metal. The noble metal is dispersed within the matrix.

The composite membrane of any of the embodiments, in combination with at least one protective layer, forms a composite membrane structure. The protective layer comprises binder and ionically conductive solid, hygroscopic fine powder or a combination thereof.

Alternatively, in a further embodiment the composite membrane comprises an ionically conductive solid, a binder and support polymer. The membrane is formed by casting a solution of the support polymer, ionically conductive solid and binder to form a film. The film may optionally be combined with a protective layer as described above.

The cast composite membrane or any of the above mentioned composite membrane structures, may be employed in a membrane electrode assembly (MEA) comprising a composite membrane structure or cast composite membrane, an anode, a cathode, and optional current collectors.

The above discussed and other features and advantages of the present invention will be appreciated and understood by those skilled in the art from the following detailed description and drawings.

DETAILED DESCRIPTION OF THE PREFERRED EMBODIMENTS

Figure 1:
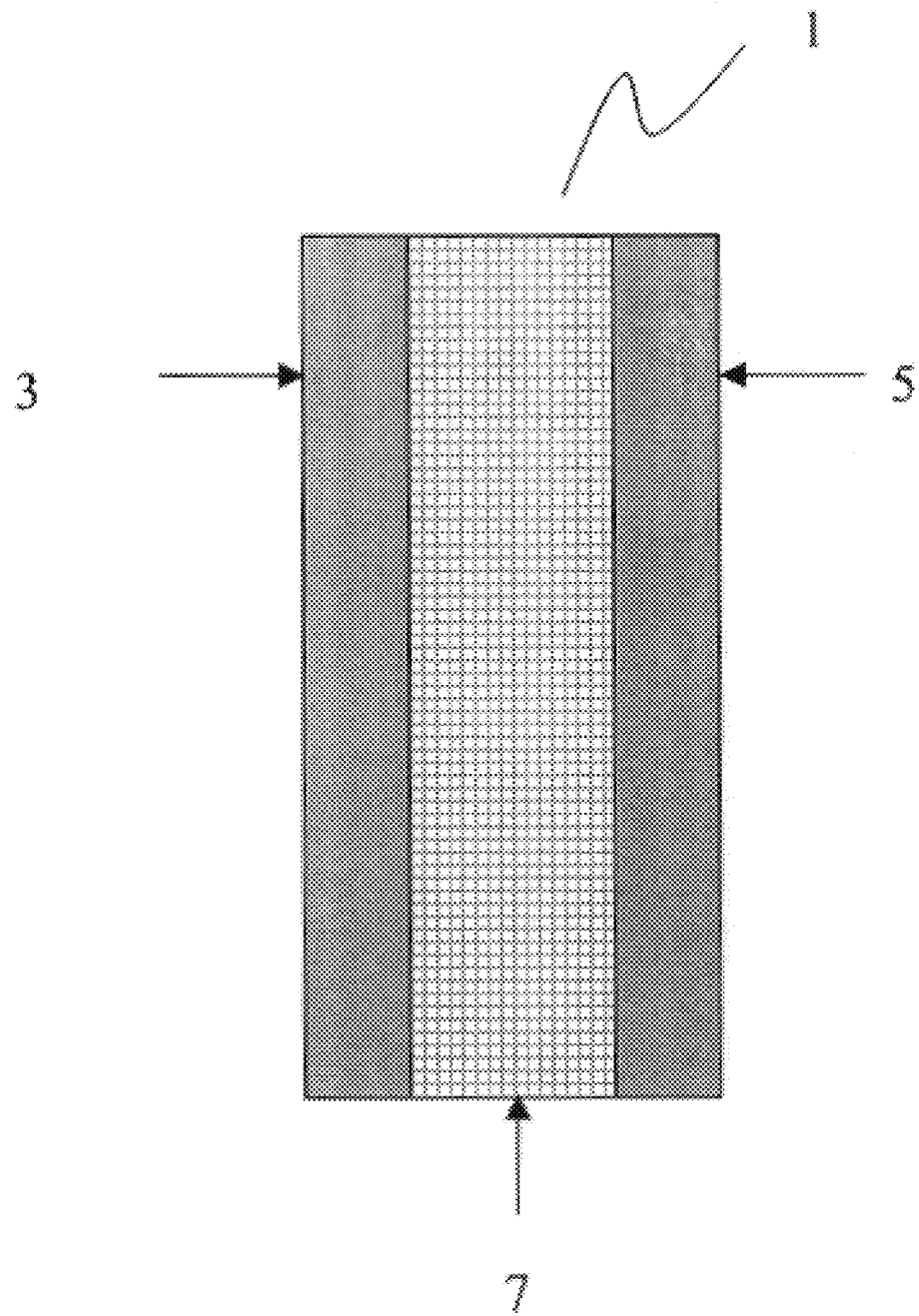
FIG. 1 is a schematic representation of a composite membrane structure having a tri-layer structure with a center layer comprising binder, noble metal and porous polymeric matrix and two outer protective layers comprising binder and ionically conductive solid.

An improved composite membrane structure comprises a composite membrane and at least one protective layer. The composite membrane comprises a porous polymeric matrix, an ionically conductive solid dispersed within the matrix, and preferably, a binder. Optionally a noble metal is dispersed within the matrix either in place of or in addition to the ionically conductive solid. The porous polymeric matrix functions as a host and/or support for the ionically conductive solid dispersed therein. The matrix may be cationically conductive, or essentially non-ionically conductive, so long as the material has negligible electronic conductivity. Suitable matrix materials are thin, possess a high porosity, fine pore size, and exhibit sufficient chemical and dimensional stability to allow fabrication and to function in their intended environments. In particular, suitable matrix materials maintain physical and dimensional stability at high temperatures, preferably above 60° C., more preferably above about 90° C., and even more preferably up to about 250° C. Most preferably, the matrix maintains integrity at temperatures in the range from about 90° C. to about 200° C. The matrix material, or at least a portion of the matrix material, must furthermore maintain its integrity in oxidizing, reducing, and acidic or alkaline environments.

Materials suitable for use as matrices in the present membranes include, but are not limited to, polytetrafluoroethylene (PTFE) (e.g., TEFLON®, available from E.I. duPont de Nemours &.Co.), polyvinylidene fluoride (PVDF), polyetheretherketone (PEEK), polyethersulfone (PES), perfluoroalkoxy (PFA), fluorinated ethylene propylene (FEP), polybenzimidazole, sulfonated polyetheretherketone, poly(phenylene oxide), sulfonated poly(phenylene oxide), polyaniline, polystyrene oxide, poly(methacrylate), and co-polymers and mixtures thereof. The polymer matrix preferably has a melting point in the range from about 160° C. to about 500° C.

The porous polymeric matrix is preferably as thin as possible to facilitate impregnation of ion exchange materials (ionically conductive solid), and binder when present, while still providing sufficient strength to the membrane for fuel cell applications. Preferred matrix thicknesses are in the range of about 0.25 mil (about 6 microns) to less than about 4 mil (about 102 microns). Preferably, the thickness of the matrix is in the range from about 0.5 mil (about 13 microns) to about 3 mil (about 76 microns), and most preferably, in the range from about 0.5 mil (about 12 microns) to about 1.5 mil (about 38 microns).

In addition to reduced thickness, the porous polymeric matrix possesses high porosity and extremely fine pore size.

The combination of thinness and fine pore size is important, as membranes having thick host matrices with large pores behave like pure ion exchange membranes when impregnated with ion exchange material. The pore size is selected to be as fine as possible while being large enough to accept the ionically conductive solid into the matrix pores. For example, when NAFION® is utilized as the binder, the pore size of the host matrix should be large enough to accommodate the ionically conductive solid and binder when present. Preferably, the matrix has pores possessing a maximum dimension in the range from about 0.025 µm to about 1 µm, and most preferably from about 0.025 µm to about 0.2 µm.

Porosity of the matrix will depend on the quantity of ionically conductive solid and optional binder required for operability of the composite membrane and is readily determined by one of ordinary skill in the art. In general, porosity is in the range from about 40% to about 95%, more preferably from about 60% to about 90% of the membrane volume.

The ionically conductive solid serves to impart and/or enhance conductivity of the composite membranes. As defined herein, "solid" means a material that is solid at fuel cell fabrication and operating temperatures. The ionically conductive solid preferably possesses little or no unbound water.

Preferred ionically conductive solids have high conductivity, preferably in the range from about $10^{-4}$ per ohm per centimeter ($\Omega^{-1}cm^{-1}$) to about 0.2 $\Omega^{-1}cm^{-1}$, more preferably from about $10^{-2}$ $\Omega^{-1}cm^{-1}$ to about 0.2 $\Omega^{-1}cm^{-1}$, and most preferably from about 0.1 $\Omega^{-1}cm^{-1}$ $^{-1}$ to about 0.2 $\Omega^{-1}cm^{-1}$.

The ionically conductive solid can be pre-made and impregnated into the porous polymeric matrix or prepared from suitable precursors during impregnation, depending on the material used. The tonically conductive solid and binder are substantially impregnated into the porous structure of the matrix in order to render the interior volume of the membrane occlusive.

Examples of preferred ionically conductive solids include, but are not limited to, inorganic species such as heteropoly acids, for example phosphotungstic acid; and metal hydrogen phosphates such as zirconium hydrogen phosphate. Heteropoly acids are particularly preferred, being proton conductive solids having conductivities of up to about 0.2 $\Omega^{-1}cm^{-1}$ at 25° C. Phosphotungstic acid, for example, in its hydrate form $H_3PO_4 \cdot (WO_3)_{12} \cdot nH_2O$, where n is equal to or greater than 6 and less than 29, has an ionic conductivity of about 0.17 $\Omega^{-1}cm^{-1}$. Since the cationic conductivity of heteropoly acids is due to the bound water, an ion exchange composite membrane containing a heteropoly acid is expected to have higher cationic conductivity than an ion exchange composite membrane without heteropoly acid. Without being bound by theory it is believed that the interaction of water, heteropoly acid, binder and/or matrix results in a decreased susceptibility to membrane dehydration at high temperatures. The addition of heteropoly acids not only creates more acid sites for proton transfer, but also provides the water for the ion exchange resin at elevated temperature. Other interactions between heteropoly acids and NAFION® have been described by Lin et al. in "Preparation of High Temperature Composite Membranes for Hydrogen Proton Exchange Membrane Fuel Cell" Hazardous and Industrial Wastes; Proceedings of the 31st Mid-Atlantic Industrial and Hazardous Waste Conference, ed. N. Nikolaidis, C. Erkey and B. F. Smets. Technomic Publishing Company, Inc., Lancaster, Pa., 656, 1999.

The amount of ionically conductive solid present in the membrane will depend on its conductivity, the required conductivity, cost, and other factors. It will generally comprise about 5 to about 50 weight percent (wt %) and preferably about 10 to about 40 wt % of the composite membrane.

Noble metals may be used in place of, or in addition to the ionically conductive solid in the composite membrane. Suitable noble metals are those metals from groups VIIA and VIIIA of the periodic table, especially ruthenium, rhenium, rhodium, palladium, osmium, iridium, and platinum. Useful noble metals are those that can oxidize hydrogen with oxygen present and preferably exhibit little or no oxidation in the fuel cell environments. When employed, the noble metals are present in amounts of about 0.01 mg/cm² to about 1.0 mg/cm² based on composite membrane structure area, preferably 0.05–0.25 mg/cm² and more preferably 0.1–0.2 mg/cm².

A binder is preferably present in the composite membrane. It aids in preventing fuel crossover and can enhance proton conductivity. Suitable binders for use in the membranes may be any chemically and electrochemically stable ion exchange resins or other polymers with high ionic conductivity.

Examples of preferred binders include, but are not limited to, ion exchange resins such as NAFION®, polystyrene sulfonic acid, and perfluorinated carboxylic acid resins. Other polymetric acid resins which form polymers, may also be used.

The ratio of binder, when present, to ionically conductive solid should adjusted so as to provide optimal physical, chemical, and electrical characteristics. A composite membrane having too high a ratio of binder to ionically conductive solid does not have high conductivity at elevated temperature. Conversely, a composite membrane having too low a ratio of binder to ionically conductive solid has an increased rate of fuel crossover. When the binder is present, the ratio of binder to ionically conductive solid is in the range of about 1:5 to about 5:1 on a weight basis.

Any of the composite membranes described above may be combined with at least one protective layer to form a composite membrane structure. The protective layer comprises a binder and ionically conductive solid, hygroscopic fine powder or combination thereof. Without being bound by theory, it is believed that the coating provides the membrane with additional protection from the harsh environment of the fuel cell thereby providing longer life to the composite membrane. Additionally the protective layer decreases the amount of crossover, thereby increasing the overall efficiency of the fuel cell. The binder and the ionically conductive solid (when present) employed in the protective layer are the same types of materials as those dispersed within the composite membrane and as such are subject to the same limitations. However, the binder and ionically conductive solid employed in the protective layer may be the same or different from the ionically conductive solid and optional binder impregnated in the composite membrane. The ratio of ionically conductive solid to binder by weight in the coating solution is about 1:1 to about 1:20 with a preferred ratio of about 1:4.

Useful hygroscopic fine powders are those which do not dissolve in water and are capable of adsorbing water. Examples of these powders are silica and titania among others. Useful average particle size of the fine powders is less than about 10 µm, preferably about 5 nm to about 100 nm. The ratio by weight of hygroscopic fine powder to binder in the coating solution is about 1:700 to about 1:9.

Alternatively, in another embodiment the composite membrane comprises an ionically conductive solid, support polymer and a binder. The binder and the ionically conductive solid are the same types of materials as those dispersed within the composite membrane with a porous polymeric matrix and as such are subject to the same limitations. Useful support polymers are polytetrafluoroethylene (PTFE) (e.g., TEFLON®, available from E.I. duPont de Nemours & Co.), polyvinylidene fluoride (PVDF), polyetheretherketone (PEEK), polyethersulfone (PES), perfluoroalkoxy (PFA), fluorinated ethylene propylene (FEP), polybenzimidazole, sulfonated polyetheretherketone, poly(phenylene oxide), sulfonated poly(phenylene oxide), polyaniline, polystyrene oxide, poly(methacrylate), and co-polymers and mixtures thereof. The membrane is formed by making a solution of ionically conductive solid, support polymer and binder and casting to form a film. Suitable solvents are those capable of dissolving the binder and ionically conductive solid. The support polymer may be dissolved in the solution or may form a dispersion in the solution. Alternatively the ionically conductive solid, support polymer and binder can be dissolved in separable solvents and then combined to form a solution for casting. Again, the ratio of binder to ionically conductive solid is in the range of about 1:5 to about 5:1 on a weight ratio basis. The ratio of support polymer to binder is in the range of about 1:1 to about 1:6 on a weight ratio basis.

The composite membranes containing a porous polymeric matrix may be prepared by dissolving the optional binder and ionically conductive solid in an organic solvent. Suitable solvents include low molecular weight alcohols such as methanol, ethanol, and isopropanol, and any other inert organic solvents which can dissolve both ionically conductive solids and ion exchange resins. The porous polymeric matrix is then impregnated with this mixture, and the impregnated membrane is then dried. Impregnation is readily determined by changes in appearance, weight or other methods known in the art.

In an alternative preparation, the binder alone is first dissolved in an organic solvent, and then combined with a second solution comprising the ionically conductive solid. The matrix is the impregnated as described above with the combined solution.

When the composite membrane incorporates a noble metal the noble metal is impregnated into the porous polymeric matrix by first dissolving the noble metal salt in a suitable solvent, for example $H_2O$. When the porous polymeric matrix is cationically conductive it may be impregnated with the noble metal by ion exchange utilizing the noble metal salt solution. If the porous polymeric matrix is not cationically conductive, then a binder is dissolved in a suitable solvent, the porous polymeric membrane is impregnated with the binder, and the impregnated membrane is subjected to by ion exchange with the noble metal salt solution.

The protective layer is disposed adjacent to at least one side of the composite membrane. The ionically conductive solid and binder are dissolved in an organic solvent to form an application solution. Suitable solvents include low molecular weight alcohols such as methanol, ethanol, and isopropanol, and any other inert organic solvents which can dissolve both ionically conductive solids and binder. The hygroscopic fine powder, when present, may dissolve or form a suspension in the solution. The ionically conductive solid and binder in the protective layer can be the same or different from the ionically conductive solid and optional binder impregnated in the porous polymeric matrix. The application solution may be applied by brushing, spraying, screen printing or any method known in the art to obtain the desired thickness. Spraying is preferred. Sufficient thickness is obtained when the composite membrane structure does not show significant reactant crossover during cell testing (less than 5 $mA/cm^2$ of hydrogen crossover current). In general such thicknesses are in the range of about 0.1 mil (2.5 $\mu$m) to about 0.3 mil (7.5 $\mu$m). Following application of the protective layer the composite membrane structure is preferably heated to a temperature in the range of about 120° C. to about 160° C. under $10^6$ Pa pressure for about for approximately 20 minutes.

In another embodiment of the composite membrane, the membrane comprises an ionically conductive solid, support polymer and a binder. Such membranes are prepared by co-dissolving a suitable binder, support polymer, and an ionically conductive solid, and casting the solution to form a film typically about 0.5 mil (13 $\mu$m) to about 1.5 mil (38 $\mu$m) thick. Alternatively, the support polymer can form a dispersion in the solution. The cast film is then dried. The resulting membrane can then be thermally treated to modify crystallinity and improve stability. Conditions of the thermal treatment such as temperature and duration depend upon the materials employed in the membrane and are readily determined by one of ordinary skill in the art. If desired one or more protective layers may be applied as described above. The ionically conductive solid and binder used in the composite membrane may be the same or different as those used in the protective layer.

Composite membranes and composite membrane structures as disclosed herein are extremely versatile. They can be combined with any electrode suitable for use in a PEM fuel cell, to form an MEA. Examples of preferred electrodes are found in U.S. Pat. Nos. 5,211,984 and 5,234,777 to Wilson as well as U.S. Pat. No. 5,330,860 to Grot. The MEA is placed between two porous substrates. The MEA and substrates are inserted between the cell separator plates to complete the fuel cell.

Figure 2:
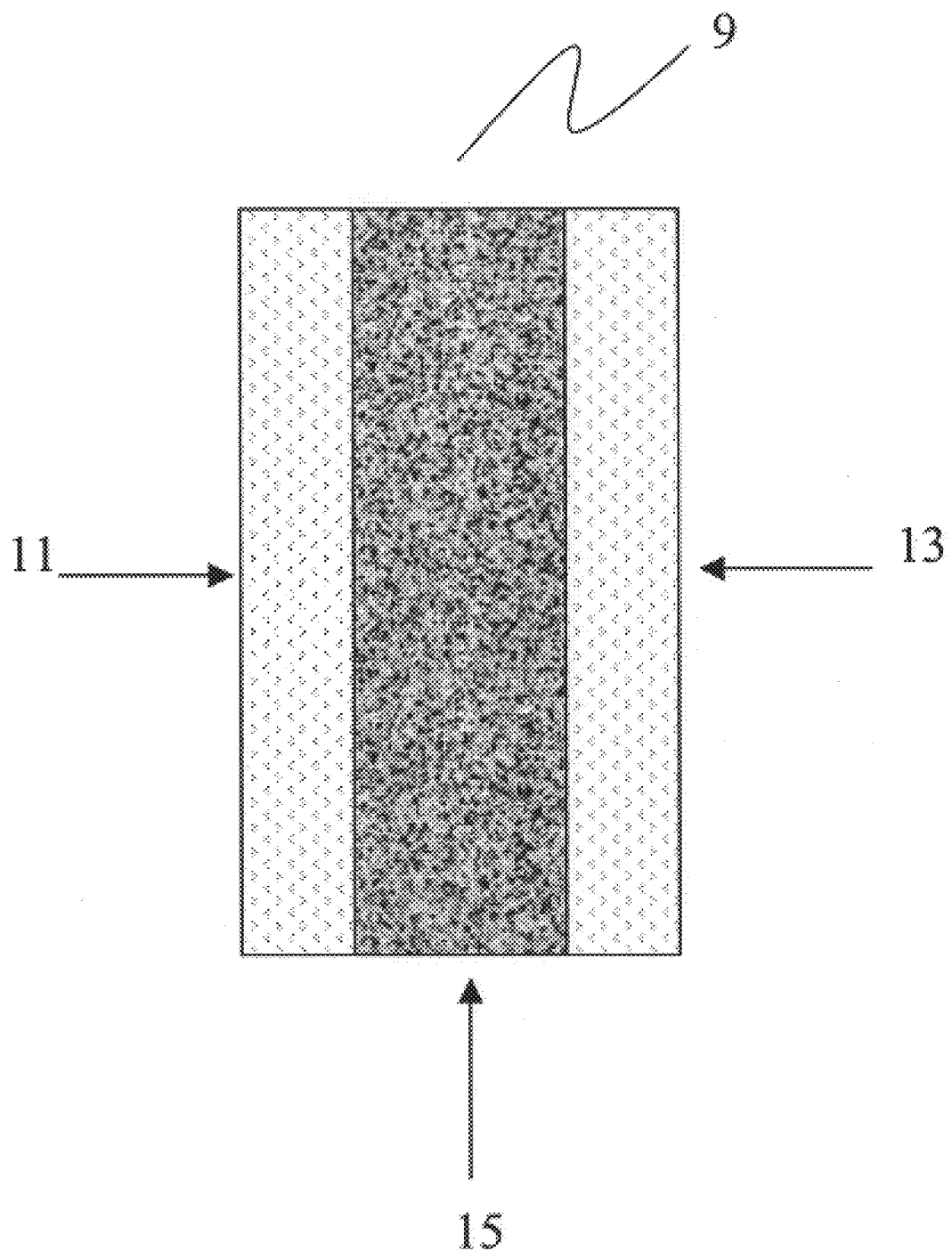
FIG. 2 is a schematic representation of a composite membrane structure having a tri-layer structure with a center layer comprising binder, porous polymeric matrix and ionically conductive solid, one protective layer comprising binder and ionically conductive solid and one protective layer comprising binder and fine powder.
Figure 3:
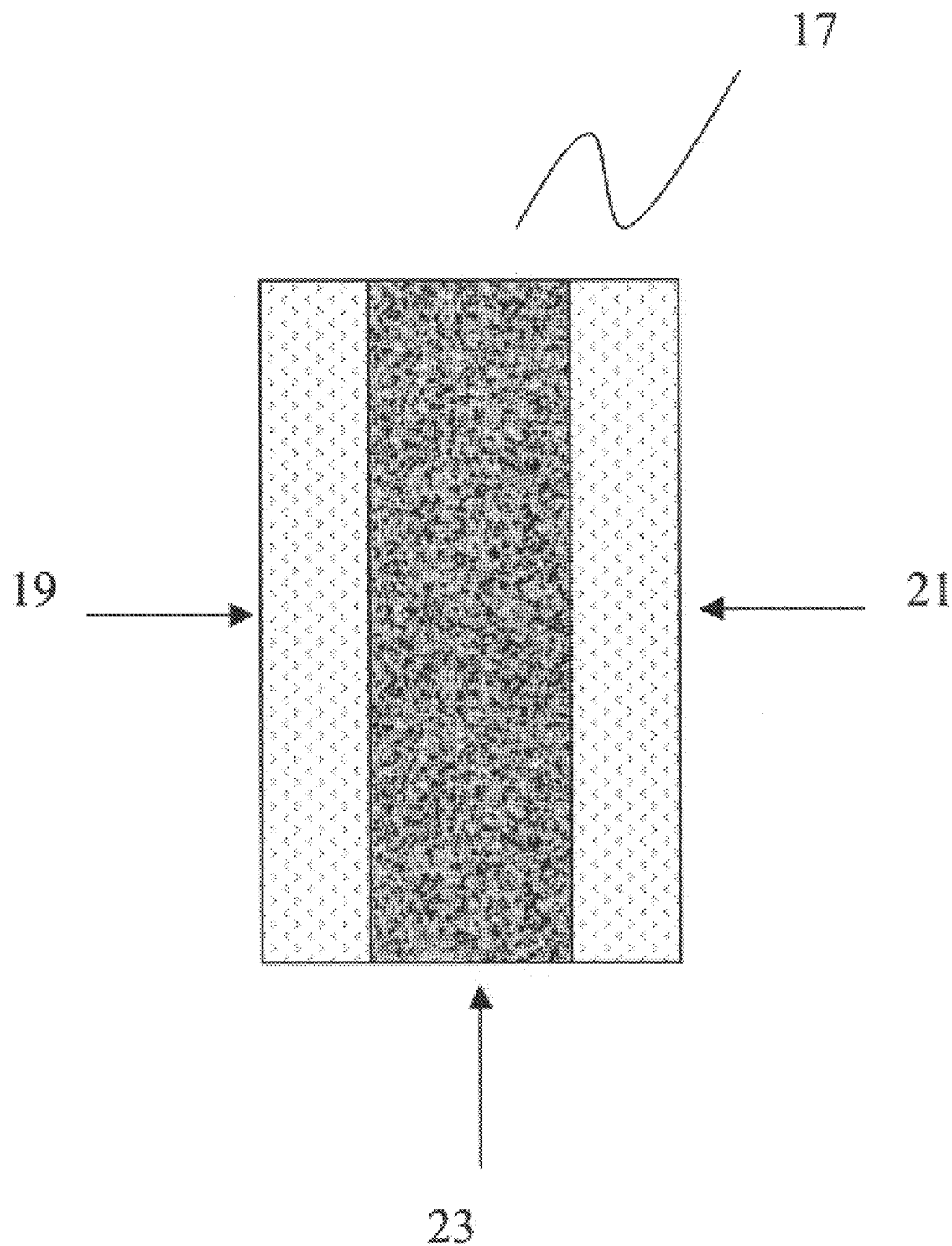
FIG. 3 is a schematic representation of a composite membrane having a tri-layer structure with a center layer comprising binder, porous polymeric matrix and ionically conductive solid and a two protective layers comprising binder and ionically conductive solid.
Figure 4:
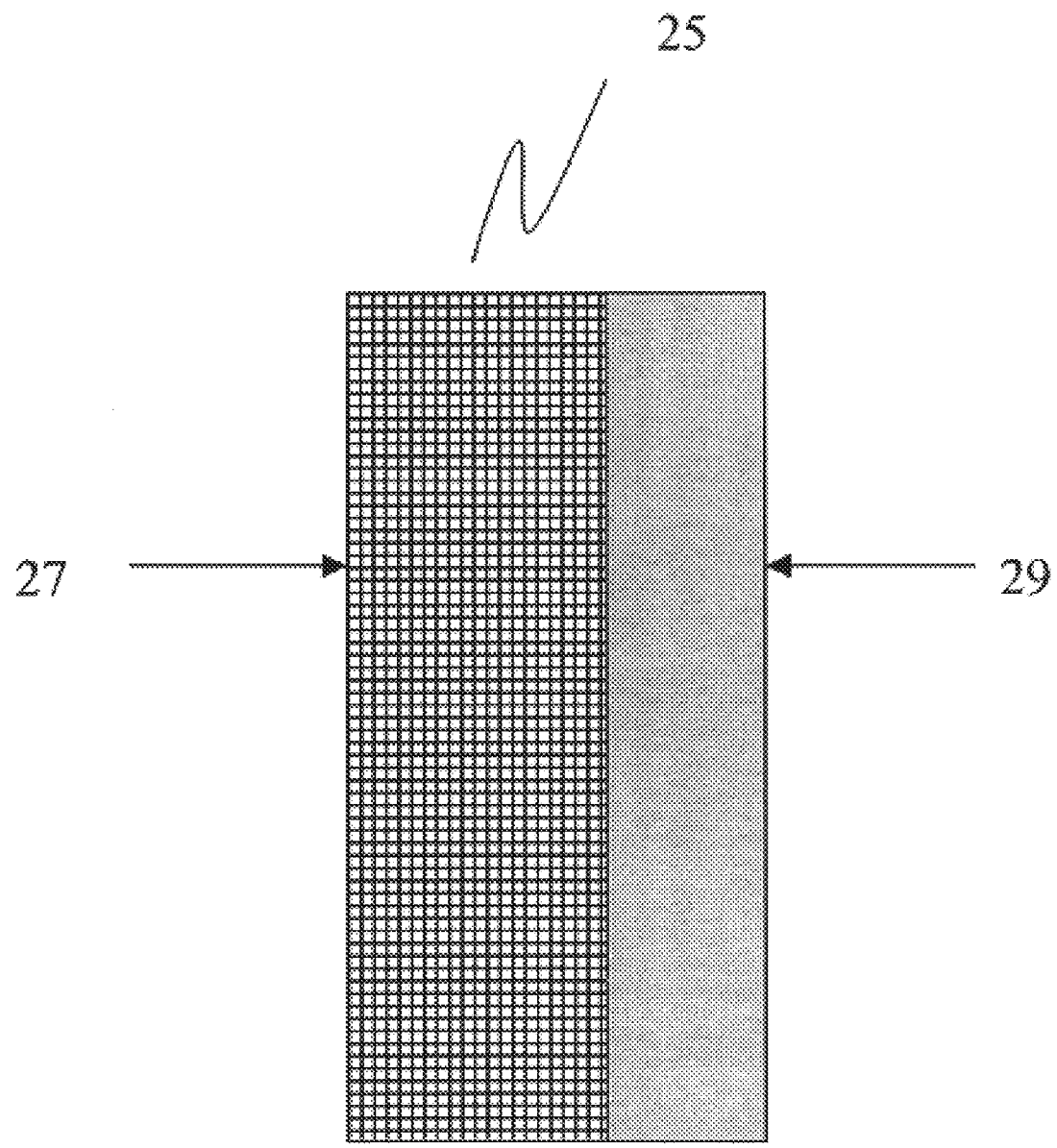
FIG. 4 is a schematic representation of a composite membrane having a bi-layer structure with a first layer comprising binder, porous polymeric matrix and ionically conductive solid and a second protective layers comprising binder and ionically conductive solid.

FIG. 1 is a schematic representation of a composite membrane structure 1 with a center layer 7 comprising porous polymeric matrix, ionically conductive solid, binder and noble metal. The outer protective layers 3, 5 comprise binder and ionically conductive solid. FIG. 2 is schematic representation of another embodiment of a composite membrane structure 9 with a center layer 15 comprising porous polymeric matrix, ionically conductive solid and binder. The protective layer 11 comprises binder, ionically conductive solid, and hygroscopic fine powder. The protective layer 13 comprises binder and hygroscopic fine powder. FIG. 3 is a schematic representation of a further embodiment of a composite membrane structure 17 with a center layer 23 comprising binder, porous polymeric matrix, and ionically conductive solid. The protective layers 19, 21 comprise binder and tonically conductive solid. FIG. 4 is a schematic representation of a composite membrane structure 25 with two layers. The first layer 27 to comprises a porous polymeric matrix, ionically conductive solid and binder. The second layer 29 comprises binder and ionically conductive solid. Of course any combination of the above described composite membranes and protective layers are within the scope of the invention.

All references cited are incorporated herein in their entirety. The invention is further illustrated by the following non-limiting Examples.

EXAMPLES

Composite membranes with a binder were made with an ionically conductive solid and for comparison, without an ionically conductive solid. A porous TEFLON® (PTFE) material with a thickness of 0.9 mil, available from Tetratec PTFE Technologies, was used as the porous, polymeric matrix. NAFION®, available from Solution Technology, Inc. as a 5% solution in lower aliphatic alcohols and water, was used as the binder. Phosphotungstic acid (PTA), available from Aldrich Chemical Company, Inc., was used as the ionically conductive solid.

Composite Membrane Structure with Binder (NT, Comparative):

The porous polymeric matrix was mounted in a holder. A 5% NAFION® solution, used as purchased, was applied to both sides of the matrix by brush to form a composite membrane. The membrane was then dried at 60° C. for 5 minutes to remove any solvent. The composite membrane was then mounted vertically, kept warm using a heat lamp, and sprayed with the NAFION® solution on both sides until the total weight of the composite membrane structure (Nafion®-Teflon, NT) was about 0.25 g/70cm$^2$. The composite membrane was then heat pressed at 120° C. under 10$^6$ Pa for 20 minutes.

Composite Membrane with Binder and Ionically Conductive Solid (NTPA, 1:1):

A 5% NAFION® solution was evaporated to dryness and redissolved in an equivalent amount of ethanol to obtain a 5% NAFION® solution in ethanol. 0.5 g of phosphotungstic acid (PTA) was dissolved in 15 g of methanol to obtain a solution. The 5% NAFION® solution (10 g) and the PTA solution (15 g) were then combined to obtain a solution with 1:1 weight ratio of PTA to Nafion®. The porous polymeric matrix was mounted in a holder. The PTA/NAFION® solution was applied to both sides of the matrix by brush to form a composite membrane. The membrane is then dried at 60° C. for 5 minutes to remove any solvent. The composite membrane was then mounted vertically, kept warm using a heat lamp, and sprayed with the PTA/NAFION® solution on both sides until the total weight of the composite membrane (Nafion®-Teflon-Phosphotungstic acid, NTPA) was about 0.25 g/70cm$^2$. The composite membrane was then heat pressed at 120° C. under 10$^6$ Pa for 20 minutes.

Composite Membrane with Binder and Tonically Conductive Solid (NTPA, 1:4):

A 5% NAFION® solution was evaporated to dryness and redissolved in an equivalent amount of ethanol to obtain a 5% NAFION® solution in ethanol. 0.125 g of phosphotungstic acid (PTA) was dissolved in 5 g of methanol to obtain a solution. The 5% NAFION® solution (10 g),and the PTA solution (5.125 g) were then combined to obtain a solution with 1:4 weight ratio of PTA to Nafion®. The porous polymeric matrix was mounted in a holder. The PTA/NAFION® solution was applied to both sides of the matrix by brush to form a composite membrane. The membrane is then dried at 60° C. for 5 minutes to remove any solvent. The composite membrane was then mounted vertically, kept warm using a heat lamp, and sprayed with the PTA/NAFION® solution on both sides until the total weight of the composite membrane (Nafion®-Teflon-Phosphotungstic acid, NTPA) was about 0.25 g/70cm$^2$. The composite membrane was then heat pressed at 120° C. under 10$^6$ Pa for 20 minutes.

Example 1

Figure 5:
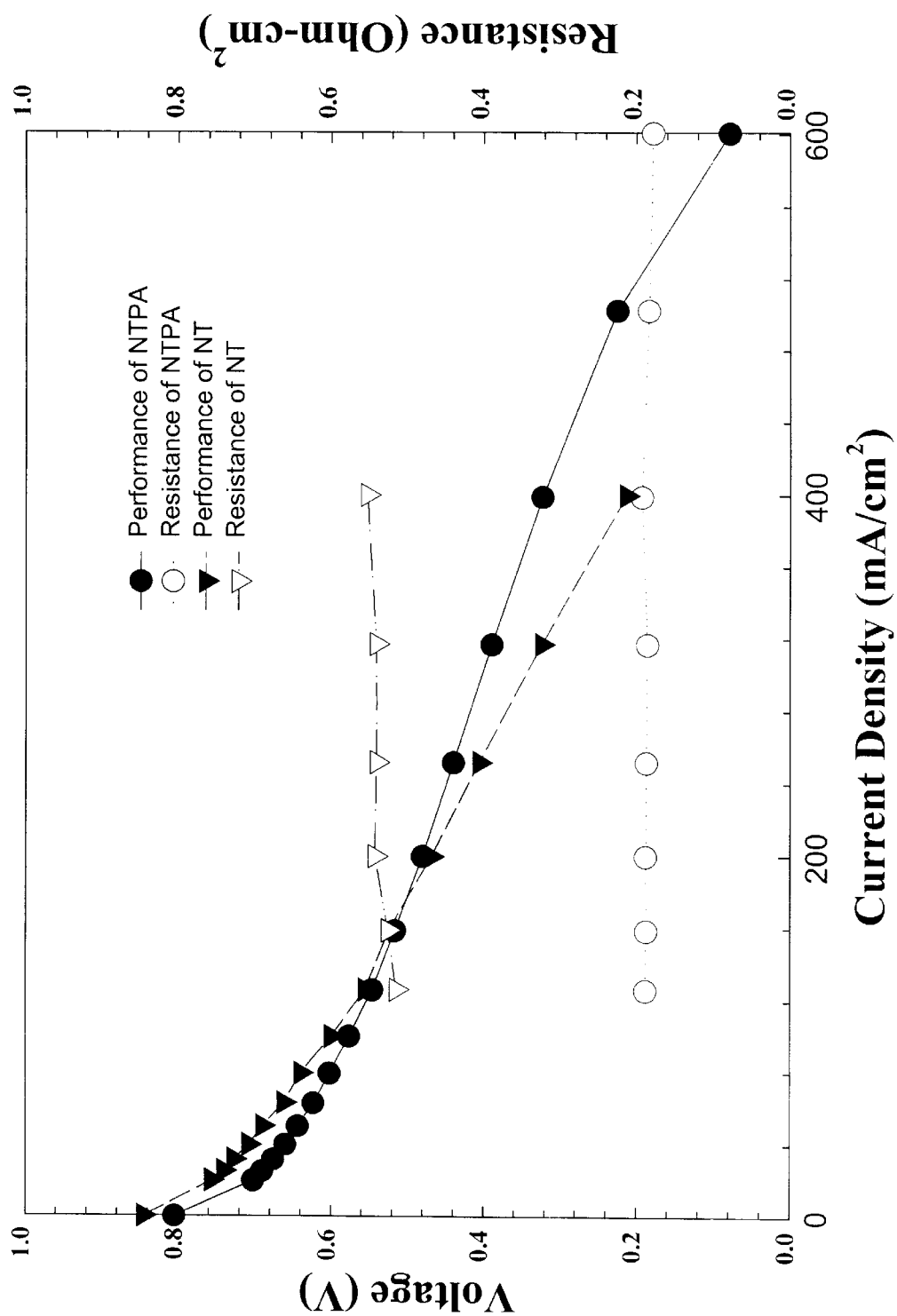
FIG. 5 is a performance and resistance comparison between Nafion®-Teflon (NT) and Nafion®-Teflon Phosphotungstic acid (NTPA) MEAs prepared by hot pressed technique.

NT and NTPA 1:4 membranes, prepared as described above, were used to fabricate membrane electrode assemblies (MEAs). The MEA's were prepared by hot pressing commercial electrodes available from E-TEK Div. of De Nora N.A., Inc. on both sides of each membrane. The anode was 20% Pt-Ru/C and cathode was 20% Pt/C. The catalyst loading for both anode and cathode was 0.4 mg/cm$^2$. 1 mg/cm$^2$ Nafion® was impregnated into the anode and cathode electrodes before being hot pressed. The performance and resistance comparisons between Nafion®-Teflon (NT) and Nafion®-Teflon phosphotungstic acid (NTPA) MEAs at 120° C. are shown in FIG. 5.

Example 2

Figure 6:
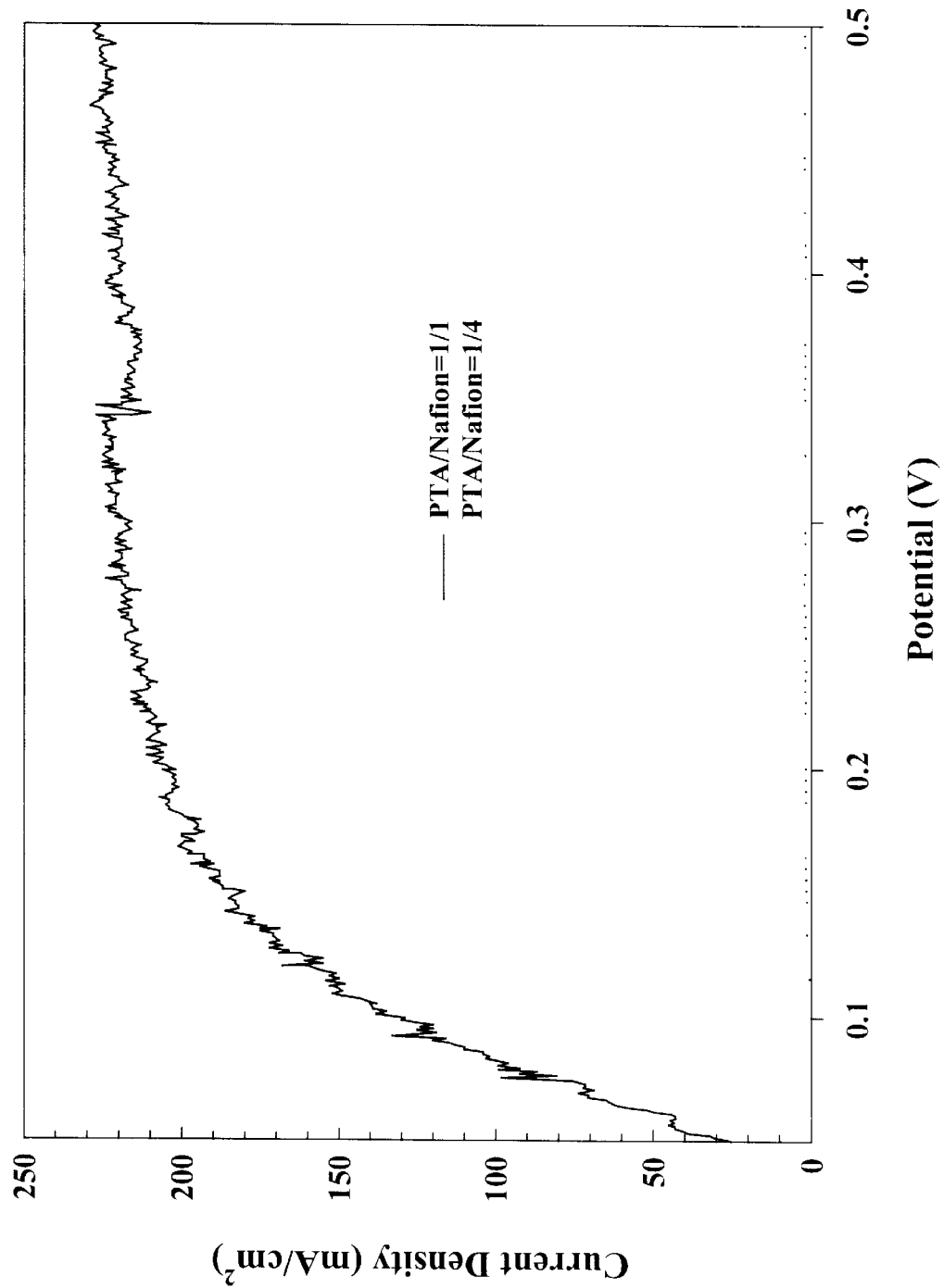
FIG. 6 is a graph of hydrogen crossover current density for different ratios of PTA/Nafion® at 110° C.

NTPA membranes (both 1:1 and 1:4), prepared as described above, were used to fabricate membrane electrode assemblies (MEAs). The MEA electrodes were prepared by spraying. The anode catalyst was prepared by mixing 0.5 g of a 5% NAFION® solution with 75 mg of 45% Pt-Ru/C catalyst available from Johnson-Matthey, stirring, sonicating and then drying in an oven at 80° C. to remove the solvent. The cathode catalyst was prepared by mixing 0.4 g of a 5% NAFION® solution with 80 mg of 40% Pt/C catalyst, available from E-TEK, stirring, sonicating, and then drying in an oven at 80° C. to remove the solvent. The NAFION® loading in the cathode and anode catalysts was 20% and 25%, respectively, by weight. The resulting catalyst materials were re-dispersed in methanol. The concentration of the resulting catalyst solutions was about 3% catalyst by weight?. The MEA was prepared by spraying the catalyst solutions on each side of the composite membrane using nitrogen gas. Cathode catalyst loading was 0.4 mg/cm$^2$ and anode catalyst loading was 0.4 mg/cm$^2$. The MEAs were examined for hydrogen crossover at 110° C. by measurement of hydrogen crossover current density as the potential of the cathode is increased using hydrogen as the anode gas and nitrogen as the cathode gas. The results are shown in FIG. 6.

Example 3

Figure 7:
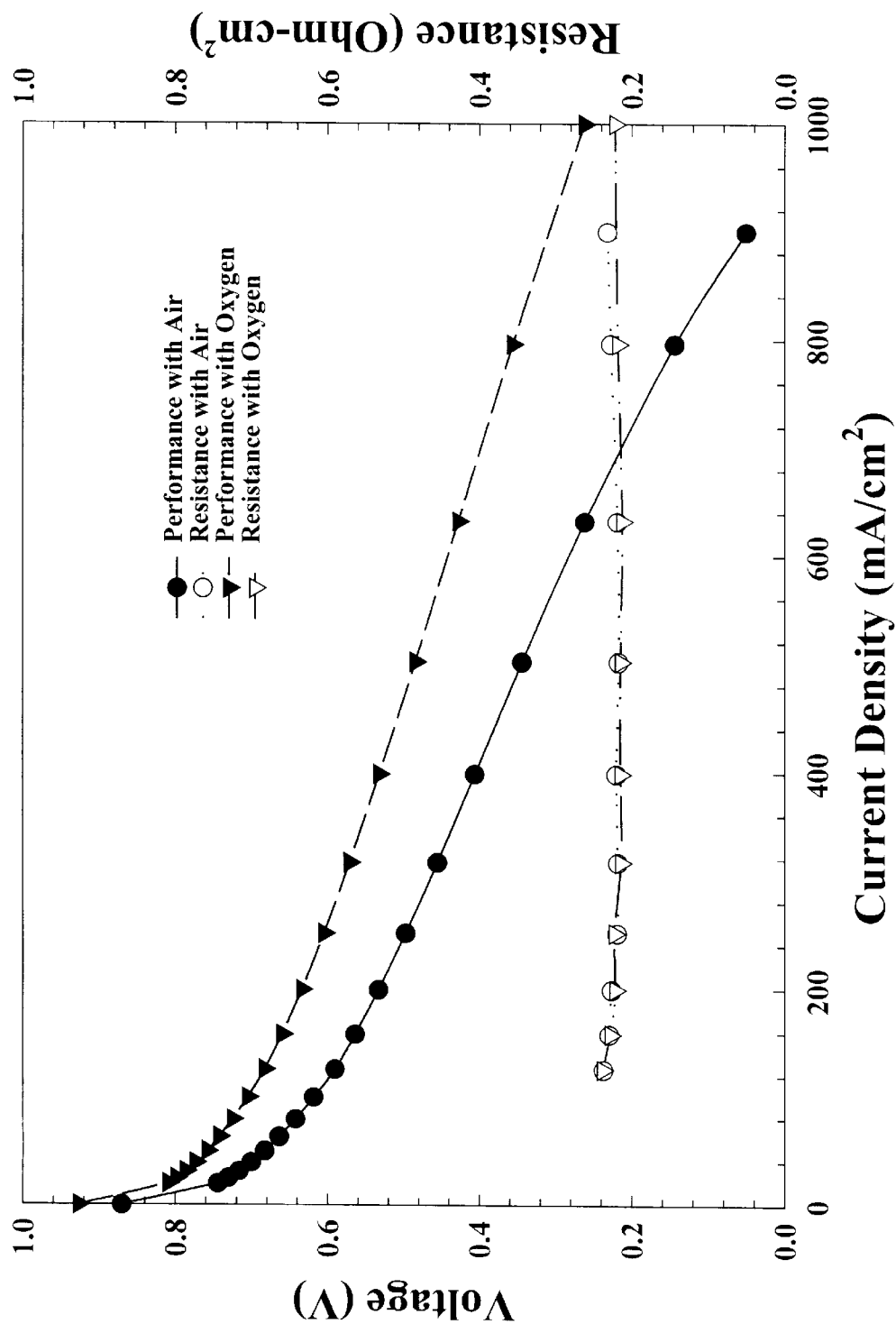
FIG. 7 is performance data of NTPA MEA at 120° C.

NTPA 1:4 composite membrane structure, prepared as described above, was used to fabricate membrane electrode assemblies (MEAs). The MEA electrodes were prepared as described in example 2. The resistance and performance voltage of the MEA was measured at 120° C. over a range of current densities using air and oxygen as shown in FIG. 7.

The importance and value of the ionically conductive solid in the composite membrane structure is clearly demonstrated in the comparison of composite membrane structures in FIG. 5. The NTPA MEA shows a 45% increase in cell voltage at 400 mA/cm compared to the NT MEA, a marked increase in performance. Additionally, resistance in the NTPA MEA was 62% lower compared to the NT MEA.

Additionally, the composite membrane structure has very low crossover. The NTPA 1:4 MEA has a current density less than 10 mA/cm$^2$ at a 0.5 volt (V) potential at 110° C. Prior art membranes typically have a current density of several hundred mA/cm$^2$ at a potential of 0.5 V and a temperature of 110° C. and the NTPA 1:1 ME has a current density of 220 mA/cm$^2$ under the same conditions. Thus the NTPA 1:4 MEA shows an improvement of more than 96 percent when compared to the NTPA 1:1 MEA and of greater than 96 percent when compared to the prior art.

As clearly demonstrated in the examples, the protective layer and incorporation of the ionically conductive solid into the composite membrane improve cell voltage and decrease crossover especially at high temperatures. The examples also clearly show that the ratio of binder to ionically conductive solid is essential to decreased crossover.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A composite membrane structure comprising:
   a composite membrane comprising a porous polymeric matrix and ionically conductive solid; and
   at least one protective layer disposed adjacent to the composite membrane, comprising binder and ionically conductive solid.

2. The composite membrane structure of claim 1 wherein the porous polymeric matrix comprises, polytetrafluoroethylene, polyvinylidene fluoride, polyetheretherketone, polyethersulfone, perfluoroalkoxy, fluorinated ethylene propylene, polybenzimidazole, polyethersulfone, sulfonated polyetheretherketone, poly(phenylene oxide), sulfonated poly(phenylene oxide), polyaniline, polystyrene oxide, poly(methacrylate), and combinations comprising at least one of the foregoing.

3. The composite membrane structure of claim 1 wherein the porous polymeric matrix has a melting point of about 100° C. to about 500° C.

4. The composite membrane structure of claim 1 wherein the porous polymeric matrix has a thickness of about 0.25 mil (6 $\mu$m) to less than about 4 mil (102 $\mu$m).

5. The composite membrane structure of claim 4 wherein the porous polymeric matrix has a thickness of about 0.5 mil (13 $\mu$m) to about 3 mil (76 $\mu$m).

6. The composite membrane structure of claim 5 wherein the porous polymeric matrix has a thickness of about 0.5 mil (13 $\mu$m) to about 1.5 mil (38 $\mu$m).

7. The composite membrane structure of claim 1 wherein the porous polymeric matrix has pores possessing a maximum dimension of about 0.025 $\mu$m to about 1 $\mu$m.

8. The composite membrane structure of claim 7 wherein the porous polymeric matrix has pores possessing a maximum dimension of about 0.025 $\mu$m to about 0.2 $\mu$m.

9. The composite membrane structure of claim 1 wherein the porous polymeric matrix has a porosity of about 40% to about 95%.

10. The composite membrane structure of claim 9 wherein the porous polymeric matrix has a porosity of about 60% to about 95%.

11. The composite membrane structure of claim 1 wherein the ionically conductive solid possesses no unbound water.

12. The composite membrane structure of claim 1 wherein the ionically conductive solid has a conductivity of about $1 \times 10^{-4}$ $\Omega^{-1}$cm$^{-1}$ to about 0.2 $\Omega^{-1}$cm$^{-1}$.

13. The composite membrane structure of claim 12 wherein the ionically conductive solid has a conductivity of about $1 \times 10^{-2}$ $\Omega^{-1}$cm$^{-1}$ to about 0.2 $\Omega^{-1}$cm$^{-1}$.

14. The composite membrane structure of claim 13 wherein the ionically conductive solid has a conductivity of about 0.1 $\Omega^{-1}$cm$^{-1}$ to about 0.2 $\Omega^{-1}$cm$^{-1}$.

15. The composite membrane structure of claim 1 wherein the ionically conductive solid is selected from the group consisting of heteropoly acids and metal hydrogen phosphates.

16. The composite membrane structure of claim 1 wherein the ionically conductive solid is phosphotungstic acid, phosphomolybdic acid, or zirconium hydrogen phosphate.

17. The composite membrane structure of claim 1 wherein the ionically conductive solid comprises about 5 to about 50 wt % of the composite membrane.

18. The composite membrane structure of claim 1 wherein the composite membrane further comprises a binder.

19. The composite membrane structure of claim 18 wherein the binder is an ion exchange resin.

20. The composite membrane structure of claim 18 wherein the binder is selected from the group consisting of perfluorinated sulfonic acid resin, polystyrene sulfonic acid resin, and perfluorinated carboxylic acid resin.

21. The composite membrane structure of claim 18 wherein the ratio of binder to ionically conductive solid in the composite membrane is from about 1:5 to about 5:1.

22. The composite membrane structure of claim 1 wherein the at least one protective layer further comprises a fine powder.

23. The composite membrane structure of claim 22 wherein the fine powder is silica or titania.

24. The composite membrane structure of claim 22 wherein the ratio by weight of fine powder to binder in the protective layer is about 1:700 to about 1:9.

25. The composite membrane structure of claim 1 wherein the composite membrane further comprises a noble metal.

26. The composite membrane structure of claim 25 wherein the noble metal is selected from the group consisting of especially ruthenium, rhenium, rhodium, palladium, osmium, iridium, and platinum.

27. The composite membrane structure of claim 25 wherein the ratio by weight of binder to noble metal is from about 1:100 to about 1:10.

28. A composite membrane structure comprising:
   a composite membrane comprising a porous polymeric matrix and noble metal; and
   at least one protective layer disposed adjacent to the composite membrane, comprising binder and ionically conductive solid.

29. The composite membrane structure of claim 28 wherein the composite membrane further comprises a binder.

30. The composite membrane structure of claim 28 wherein the at least one protective layer further comprises a fine powder.

31. A composite membrane structure comprising:
   a composite membrane comprising a porous polymeric matrix and ionically conductive solid; and
   at least one protective layer disposed adjacent to the composite membrane, comprising binder and fine powder.

32. A composite membrane structure comprising:
   a composite membrane comprising a porous polymeric matrix and noble metal; and
   at least one protective layer disposed adjacent to the composite membrane, comprising binder and fine powder.

* * * * *